US009470349B2

(12) United States Patent
Am et al.

(10) Patent No.: US 9,470,349 B2
(45) Date of Patent: Oct. 18, 2016

(54) SWIVEL JOINT

(71) Applicant: HILTAP FITTINGS, LTD., Calgary, Alberta (CA)

(72) Inventors: David Am, Calgary (CA); Mark J. Tausch, West Chester, OH (US); David K. Morrow, Cincinnati, OH (US)

(73) Assignee: Hiltap Fittings, Ltd., Calgary, Alberta (CA)

( * ) Notice: Subject to any disclaimer, the term of this patent is extended or adjusted under 35 U.S.C. 154(b) by 667 days.

(21) Appl. No.: 13/895,482

(22) Filed: May 16, 2013

(65) Prior Publication Data

US 2013/0320670 A1    Dec. 5, 2013

Related U.S. Application Data

(60) Provisional application No. 61/653,461, filed on May 31, 2012.

(51) Int. Cl.
*F16L 27/08*    (2006.01)

(52) U.S. Cl.
CPC ............ *F16L 27/08* (2013.01); *F16L 27/0828* (2013.01); *F16L 27/0845* (2013.01); *Y10T 29/49826* (2015.01)

(58) Field of Classification Search
CPC ............ F16L 27/0828; F16L 27/0845; F16L 27/0824; B67D 9/02
USPC ........................................................ 285/276
See application file for complete search history.

(56) References Cited

U.S. PATENT DOCUMENTS

| 790,118 | A |  | 5/1905 | Everson |  |
|---|---|---|---|---|---|
| 846,704 | A |  | 3/1907 | Stucy |  |
| 908,414 | A |  | 12/1908 | Mellin |  |
| 1,197,588 | A |  | 9/1916 | Austin |  |
| 1,346,524 | A |  | 7/1920 | Norwood |  |
| 1,429,199 | A | * | 9/1922 | Finney | ............... F16K 11/18 137/605 |
| 1,582,246 | A | * | 4/1926 | Buchanan | ............ F16L 27/023 285/13 |
| 2,383,679 | A |  | 8/1945 | Phillips |  |

(Continued)

FOREIGN PATENT DOCUMENTS

WO    2013181269    12/2013

OTHER PUBLICATIONS

U.S. Appl. No. 12/396,916, Sep. 28, 2010, Office Action.

(Continued)

*Primary Examiner* — David E Bochna
(74) *Attorney, Agent, or Firm* — Workman Nydegger

(57) ABSTRACT

A fluid system swivel joint includes a body and a tail rotatably connected together and which partially define a fluid passageway. The tail has an integrally formed flange for connecting to other fluid conduits. A counterbalancing mechanism is disposed within the fluid passageway. The counterbalancing mechanism has a selectively adjustable level of tension that adjusts the amount of force required to rotate the tail relative to the body. At least a portion of the counterbalancing mechanism can be selectively inserted into or removed from the fluid passageway through an opening in the body. The opening in the body can be closed off with an end plate. A swivel assembly rotatably connects the body to a fluid conduit so that the body can rotate relative to the fluid conduit. The swivel assembly includes a collar fixedly and selectively connectable to the body, and a flange body rotatably connected to the collar.

17 Claims, 8 Drawing Sheets

(56) References Cited

U.S. PATENT DOCUMENTS

| | | | |
|---|---|---|---|
| 2,506,096 A | | 5/1950 | Marshall |
| 2,737,362 A | * | 3/1956 | Krone .................. F16L 27/0845 267/155 |
| 3,479,065 A | | 11/1969 | Bahlke |
| 3,663,043 A | | 5/1972 | Walton |
| 3,679,235 A | | 7/1972 | Faccou |
| 3,746,372 A | | 7/1973 | Hynes |
| 3,957,291 A | | 5/1976 | Edling |
| 4,111,465 A | | 9/1978 | Knight |
| 4,154,551 A | | 5/1979 | Petrie |
| 4,186,950 A | | 2/1980 | Billingsley |
| 4,789,188 A | * | 12/1988 | Seabrook ............ F16L 27/0824 184/31 |
| 5,983,936 A | * | 11/1999 | Schwieterman ........ F16F 1/041 137/615 |
| 8,157,295 B2 | | 4/2012 | Krywitsky |

OTHER PUBLICATIONS

U.S. Appl. No. 12/396,916, Mar. 8, 2011, Office Action.
U.S. Appl. No. 12/396,916, Aug. 22, 2011, Office Action.
U.S. Appl. No. 12/396,916, Jan. 6, 2012, Notice of Allowance.
International Search Report and Written Opinion dated Jan. 3, 2014 for PCT/US2013/043144.

* cited by examiner

SWIVEL JOINT

CROSS-REFERENCE TO RELATED APPLICATIONS

This application claims priority to and the benefit of U.S. Provisional Patent Application Ser. No. 61/653,461, entitled SWIVEL JOINT, filed May 31, 2012, which is hereby incorporated herein by reference in its entirety.

BACKGROUND

1. Technical Field

Exemplary embodiments of the invention relate to fluid systems. More particularly, exemplary embodiments of the invention relate to torsionally controlled swivel joints.

2. The Relevant Technology

In many fluid systems, fluids are transferred from one reservoir to another. For instance, in the oil and gas industry, fluids are transferred from storage tanks to transport vehicles (e.g., tank trucks, railroad cars, ships, etc.) so that the fluids may be transported to various destinations. To transfer the fluid from the storage tank to the transport vehicles, the fluids are pumped through a loader arm.

A first end of the loader arm is connected to a riser or stand pipe. The stand pipe is in fluid communication with the storage tank so that the fluid in the storage tank may be pumped from the storage tank and into the loader arm. The stand pipe typically provides a strong platform upon which the loader arm can be mounted.

To facilitate connection of a second end of the loader arm to the transport vehicle, the first end of the loader arm may be connected to the stand pipe with a swivel joint. The swivel joint may allow the loader arm to rotate in one or more directions so that the loader arm may be repositioned to enable the second end of the loader arm to be connected to the transport vehicle.

Due to the weight of the loader arm and the fluids pumped therethrough, mechanisms have been developed to counterbalance the rotational forces resulting from this weight. Counterbalancing the rotational forces reduces the level of effort required of an operator to manipulate the loader arm and increases the safety of these systems. Such counterbalancing mechanisms have included external counterbalancing weights, hydraulic cylinders, spring and lever arm assemblies, pulley and cable systems, and the like. Such systems include many external parts that are not only expensive, but which also get in the operator's way and sometimes cause physical injury to the operators as well as damage to the equipment itself.

In other cases, internal counterbalancing mechanisms have been used. For instance, torsion springs have been disposed with the swivel joints to counterbalance and support the weight of the loader arm and fluid therein. Although these internal mechanisms counterbalance the weight of the loader arms and fluid, they make the swivel joints difficult to assemble, disassemble, and service. For instance, during assembly of the swivel joint, the torsion spring is disposed within mating halves of the joint. The joint is then placed in a large vice to compress the mating halves together to align bearing races in each half so that bearings may be inserted therein. Likewise, when worn bearings need to be replaced, the swivel joint must be removed from the stand pipe and loader arm, placed in the large vice, and compressed to allow for the bearings to be removed. When the mating halves and the torsion spring are assembled, the swivel joint can be quite heavy and difficult to move, thus making it difficult to move the swivel joint to and from the vice when the joint needs to be compressed.

Accordingly, what is desired is a relatively low-cost swivel joint that can counterbalance the weight of a loader arm and any fluid therein. It is also desired to provide a torsionally controlled swivel joint that allows for ready assembly and maintenance.

BRIEF SUMMARY

Exemplary embodiments of the invention relate to a torsionally controlled swivel joint which can counterbalance the weight of a loader arm and any fluid therein, thereby reducing the level of effort required of an operator to manipulate the loader arm when connecting or disconnecting the loader arm from a transport vehicle.

For example, in one embodiment a fluid system swivel joint includes a body and a tail rotatably connected together. The body and tail partially define a fluid passageway. The tail has an integrally formed flange for connecting to other fluid conduits. A counterbalancing mechanism is disposed within the fluid passageway and has a selectively adjustable level of tension that adjusts the amount of force required to rotate the tail relative to the body. At least a portion of the counterbalancing mechanism can be selectively inserted into or removed from the fluid passageway through an opening in the body. The opening in the body can be closed off with an end plate. A swivel module rotatably connects the body to a fluid conduit so that the body can rotate relative to the fluid conduit. The swivel module includes a collar fixedly and selectively connectable to the body, and a flange body rotatably connected to the collar.

In another embodiment, a fluid swivel joint includes a body defining first, second, and third openings. A tail is rotatably connectable to the body at the first opening in the body. The tail includes an integrally formed flange that is connectable to a first fluid conduit in a fluid system. The body and tail cooperate to at least partially define a fluid passageway through said swivel joint. A counterbalancing mechanism is disposed within the fluid passageway. At least a portion of the counterbalancing mechanism can be selectively inserted into or removed from the fluid passageway through the second opening in the body. An end cap can selectively close the second opening in the body. The counterbalancing mechanism includes a tail tang plate, worm gear tang plate, and a torsion spring. The tail tang plate is selectively connectable to an interior surface of the tail and is held in a fixed position relative to the tail when the tail tang plate is connected to the tail. The worm gear tang plate is disposed within the body and may be selectively rotated. The torsion spring is linked between the tail tang plate and the worm gear tang plate such that rotation of the worm gear tang plate adjusts a level of tension in the torsion spring. Also included is a selectively removable swivel module that rotatably connects the body to a second fluid conduit in a fluid system. The swivel module has a collar and a flange body. The collar is selectively and fixedly connectable to the body at the third opening in the body. The flange body is rotatably connectable to the collar and fixedly connectable to the second fluid conduit.

In yet another exemplary embodiment, a method is provided for assembling a body and a tail of a fluid swivel joint. The method includes providing a compression tool that has an elongated shaft, a weldment plate disposed at a first end of the shaft, and a selectively removable compression plate movably disposed at a second end of the shaft. The weldment plate is secured to an interior surface of the tail. A seal is installed in the body. Thereafter, the body is installed over a portion of the tail so that the seal engages both the body and the tail. The compression plate is positioned on the shaft so that the compression plate engages the body. Then, the compression plate is advanced along the shaft. Advancing the compression plate along the shaft moves the body and the tail closer together and compresses the seal. By advancing the compression plate along the shaft and moving the body and the tail closer together, ball grooves formed in the body and the tail are aligned. Once the ball grooves are aligned, ball bearings are inserted into the ball grooves.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope, nor are the drawings necessarily drawn to scale. The invention will be described and explained with additional specificity and detail through the use of the accompanying drawings in which.

DETAILED DESCRIPTION

Exemplary embodiments of the invention relate to a torsionally controlled swivel joint which can counterbalance the weight of a loader arm and any fluid therein, thereby reducing the level of effort required of an operator to manipulate the loader arm when connecting or disconnecting the loader arm from a transport vehicle. For example, in one embodiment a fluid system swivel joint includes a body and a tail rotatably connected together. The body and tail partially define a fluid passageway. The tail has an integrally formed flange for connecting to other fluid conduits. A counterbalancing mechanism is disposed within the fluid passageway and has a selectively adjustable level of tension that adjusts the amount of force required to rotate the tail relative to the body. At least a portion of the counterbalancing mechanism can be selectively inserted into or removed from the fluid passageway through an opening in the body. The opening in the body can be closed off with an end plate. A swivel assembly rotatably connects the body to a fluid conduit so that the body can rotate relative to the fluid conduit. The swivel assembly includes a collar fixedly and selectively connectable to the body, and a flange body rotatably connected to the collar.

Reference will now be made to the drawings to describe various aspects of exemplary embodiments of the invention. It is understood that the drawings are diagrammatic and schematic representations of such exemplary embodiments, and are not limiting of the present invention, nor are they necessarily drawn to scale. No inference should therefore be drawn from the drawings as to the dimensions of any invention or element. In the following description, numerous specific details are set forth in order to provide a thorough understanding of the present invention. It will be obvious, however, to one of ordinary skill in the art that the present invention may be practiced without these specific details.

Figure 1:
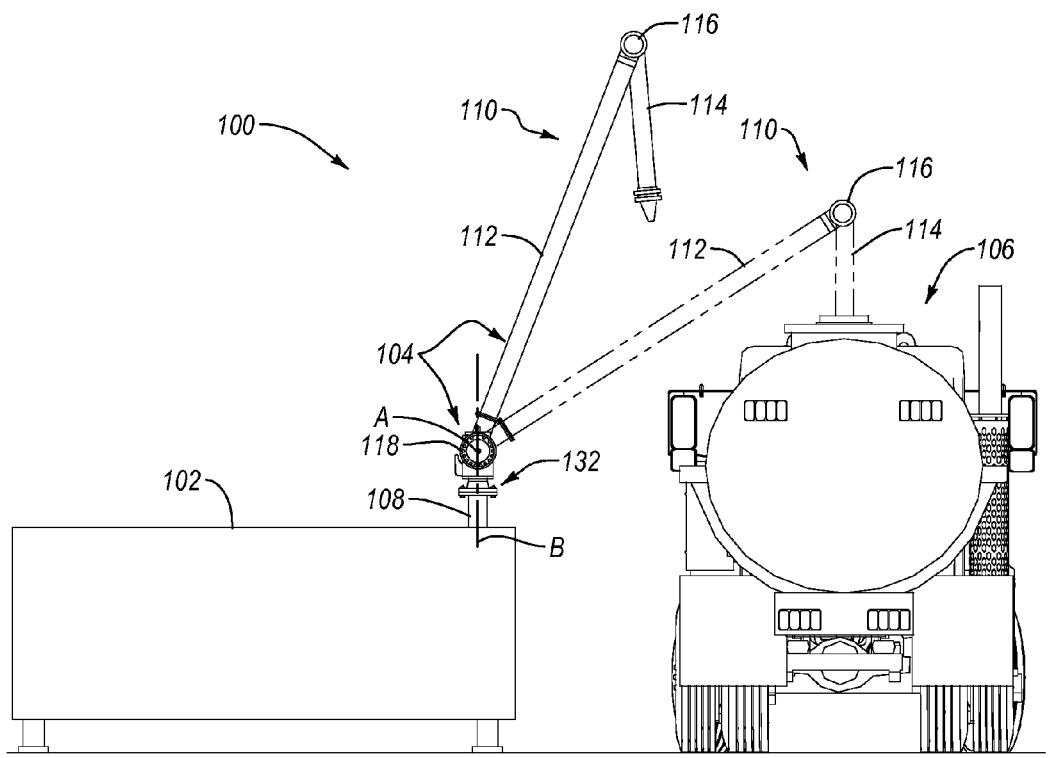
FIG. 1 depicts an exemplary fluid system for at least some embodiments of the present invention.
Figure 2:
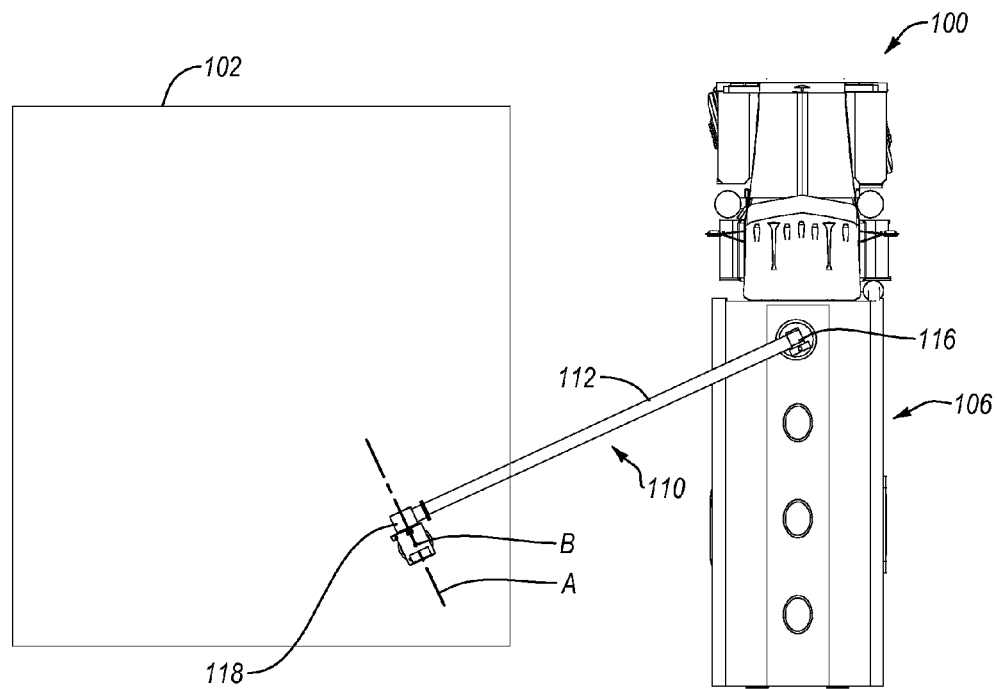
FIG. 2 illustrates a top view of the fluid system of FIG. 1.

With reference first to FIGS. 1 and 2, one exemplary embodiment of a fluid system is indicated generally at 100. As used herein, "fluid" is not limited to liquids, but can include a variety of other compositions. For example, the term "fluid," as used herein, may include liquids, gases, liquid-gas combinations, slurries, liquid-solid combinations, gas-solid combinations, and liquid-solid-gas combinations.

In the exemplary embodiment depicted in FIGS. 1 and 2, fluid system 100 includes a fluid source 102, a fluid transfer system 104, and a transport vehicle 106. In the illustrated embodiment, fluid transfer system 104 is in fluid communication with fluid source 102 such that fluid in fluid source 102 may be selectively pumped through fluid transfer system 104. Fluid transfer system 104 may be selectively connected to an inlet on transport vehicle 106, or other fluid destination, so that a reservoir in transport vehicle 106 may be filled with the fluid pumped through fluid transfer system 104.

Fluid source 102 may take any one of a number of configurations. For instance, fluid source 102 may include manmade storage tanks or reservoirs (e.g., above ground tanks, below ground tanks, stationary tanks, moveable tanks, etc.). Fluid source 102 may also include natural fluid reservoirs (e.g., lakes, oceans, underground gas or oil deposits, etc.). As shown in FIG. 1, fluid source 102 may also include a riser or stand pipe 108 in fluid communication with the fluid in fluid source 102. The fluid in fluid source 102 may be pumped out of fluid source 102 through stand pipe 108. Stand pipe 108 may be stably secured in place and may be strong enough to support fluid transfer system 104, which is mounted on stand pipe 108 as shown in FIG. 1.

In the illustrated embodiment, fluid transfer system 104 includes a loader arm 110 having an inboard loading arm 112 and an outboard loading arm 114 that are connected together with a standard swivel joint 116 to allow outboard loading arm 114 to move relative to inboard loading arm 112. As shown in FIG. 1, outboard loading arm 112 may be selectively coupled to an inlet on transport vehicle 106, such as with a standard vapor control coupling.

In the illustrated embodiment, loader arm 110 is connected to stand pipe 108 via a swivel joint 118. Swivel joint 118 allows for loader arm 110 to rotate about two axes, A, B. In the illustrated embodiment, the first axis of rotation, axis A, is generally parallel with the ground. Rotation of loader arm 110 about axis A allows outboard loading arm 114 to be moved between the storage (solid lines) and filling (dashed lines) positions shown in FIG. 1.

As can be seen in FIG. 1, swivel joint 116 and outboard loading arm 114 are vertically higher in the storage position than when in the filling position. Also, swivel joint 116 and outboard loading arm 114 are horizontally further away from swivel joint 118 in the filling position than when in the storage position. Thus, rotating loader arm 110 about axis A allows outboard loading arm 114 to be lowered and moved horizontally for connection to transport vehicle 106. Rotating loader arm 110 about axis A also allows outboard loading arm 114 to be raised and moved horizontally into the storage position.

In the illustrated embodiment, the second axis of rotation, axis B, about which loader arm 110 rotates is generally perpendicular to the ground and to axis A. Axis B may be generally parallel to or collinear with an axis of stand pipe 108. Rotation of loader arm 110 about axis B allows outboard loading arm 114 to be moved longitudinally along the length of fluid supply 102, as shown in FIG. 2. Such repositioning of outboard loading arm 114 may be useful when transport vehicle 106 is positioned at different locations along the length of fluid source 102. For instance, transport vehicle 106 may be parked at various locations relative to fluid source 102, and more particularly to stand pipe 108. As a result, outboard loading arm 114 may need to be repositioned along the length of transport vehicle 106 in order to connect to the inlet on transport vehicle 106. Accordingly, swivel joint 118 enables loader arm 110 to rotate about axis B so that outboard loading arm 114 may be connected to transport vehicle 106 even when the longitudinal position of transport vehicle 106 may vary.

Figure 3A:
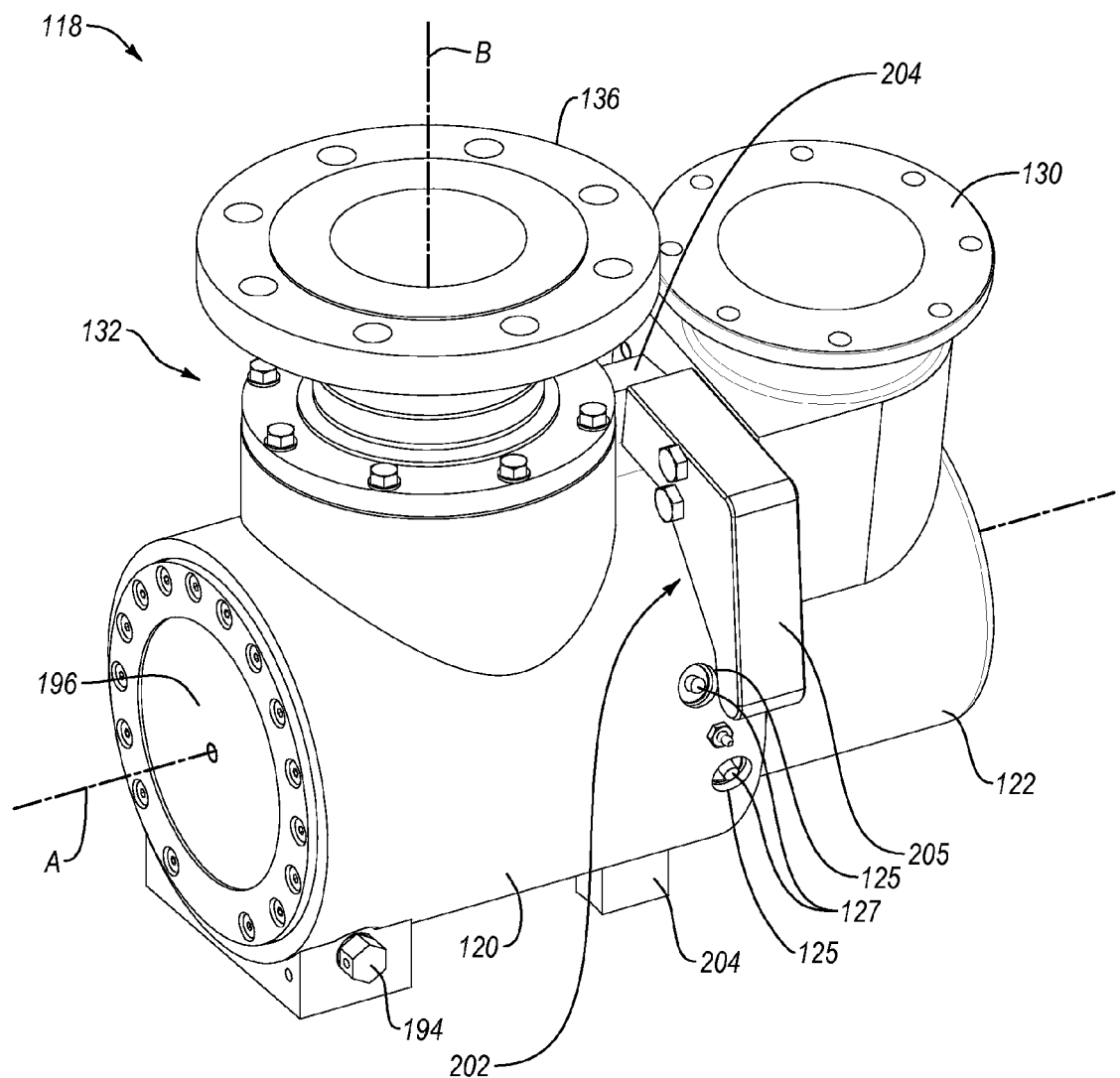
FIG. 3A illustrates a perspective view of a swivel joint for use in a fluid system, such as the fluid system of FIGS. 1 and 2.
Figure 3B:
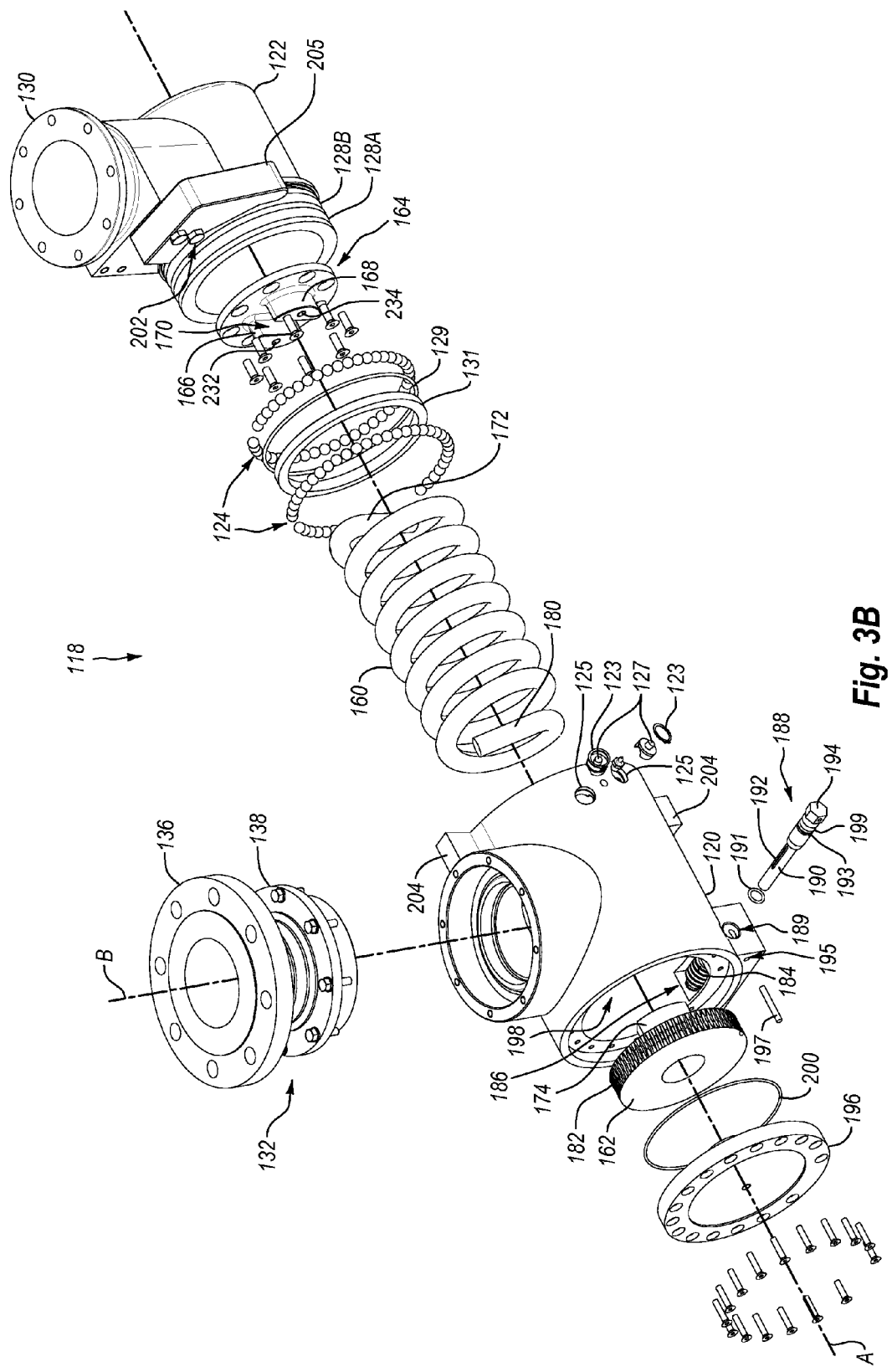
FIG. 3B illustrates a partially exploded view of the swivel joint of FIG. 3A.
Figure 4:
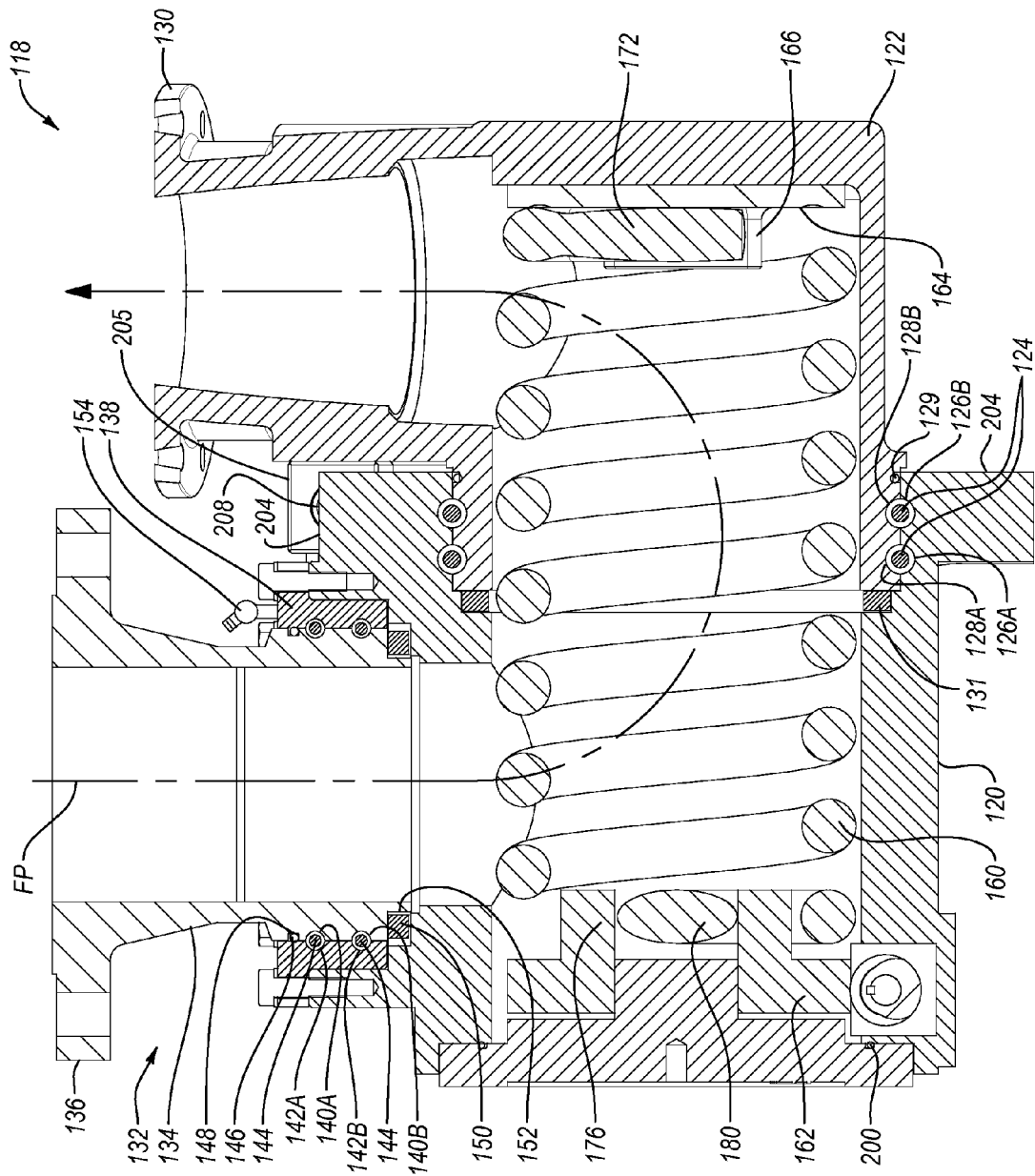
FIG. 4 illustrates a cross-sectional view of the swivel joint of FIG. 3A.

Attention is now directed to FIGS. 3A-4, which illustrate perspective, exploded, and cross-sectional views, respectively, of swivel joint 118 when separated from the other components of fluid system 100. Attention is also directed to FIGS. 5-6, which illustrate sub assemblies of swivel joint 118 in greater detail.

As shown in FIGS. 3A-4, swivel joint 118 includes two primary housing components, namely a body 120 and a tail 122. When assembled as shown in FIGS. 3A and 4, swivel joint 118 defines a fluid passageway therethrough, as indicated in FIG. 4 by arrow FP. Body 120 and tail 122 may be rotatably connected together so that tail 122 and loader arm 110 can rotate relative to body 120 and about axis A. The rotatable connection between body 120 and tail 122 is made via ball bearings 124 disposed within ball grooves formed in body 120 and tail 122. More specifically, body 120 includes body ball grooves 126A, 126B formed on an interior surface and tail 122 includes tail ball grooves 128A, 128B formed on an exterior surface. As discussed below, when body ball grooves 126A, 126B are aligned with tail ball grooves 128A, 128B, ball bearings 124 may be inserted therebetween. The positioning of ball bearings 124 between body ball grooves 126A, 126B and tail ball grooves 128A, 128B both connects body 120 and tail 122 together and enables tails 122 to rotate relative to body 120. Ball bearings 124 may be inserted into the ball grooves through one or more ball holes 125 in body 120, as shown in FIG. 3B. Once ball bearings 124 are inserted into the ball grooves, ball holes 125 may be closed with one or more ball plugs 127.

One or more seals may be used to prevent leaks between body 120 and tail 122. As shown in FIG. 4, for instance, an O-ring seal 129 may be positioned between body 120 and tail 122 so that seal 129 engages an interior surface of body 120 and an exterior surface of tail 122. A seal 131 may also be positioned between an end of tail 122 and an interior surface of body 120, as shown in FIG. 4. Seal 131 may have a circular, trapezoidal, or other geometric cross-sectional shape.

Tail 122 includes a flange 130 that may be connected to loader arm 110. Notably, flange 130 is integrally formed with tail 122. Many swivel joints have separate flanges that are connected to a housing member. For instance, flanges are often connected to the housing members with a threaded connection that is sealed with pipe dope or TEFLON tape. Such connections, however, are often subject to misalignment. As the system attempts to self-correct the misalignment, the threaded connection may be loosened, resulting in a leak being created between the housing member and the flange. By integrally forming flange 130 with tail 122, potential misalignments and leak paths are eliminated.

Body 120 may be connected to stand pipe 108 via a removable swivel module 132, which enables swivel joint 118 and loader arm 110 to rotate about axis B. Swivel module 132 includes a flange body 134 with a flange 136 at one end. Flange 136 may be bolted or otherwise connected to stand pipe 108 so that flange body 134 is maintained in a fixed position relative to stand pipe 108. A second end of flange body 134 may have a collar 138 positioned therearound. Collar 138 may be bolted or otherwise connected to body 120 so that collar 138 is maintained in a fixed position relative to body 120.

Figure 5:
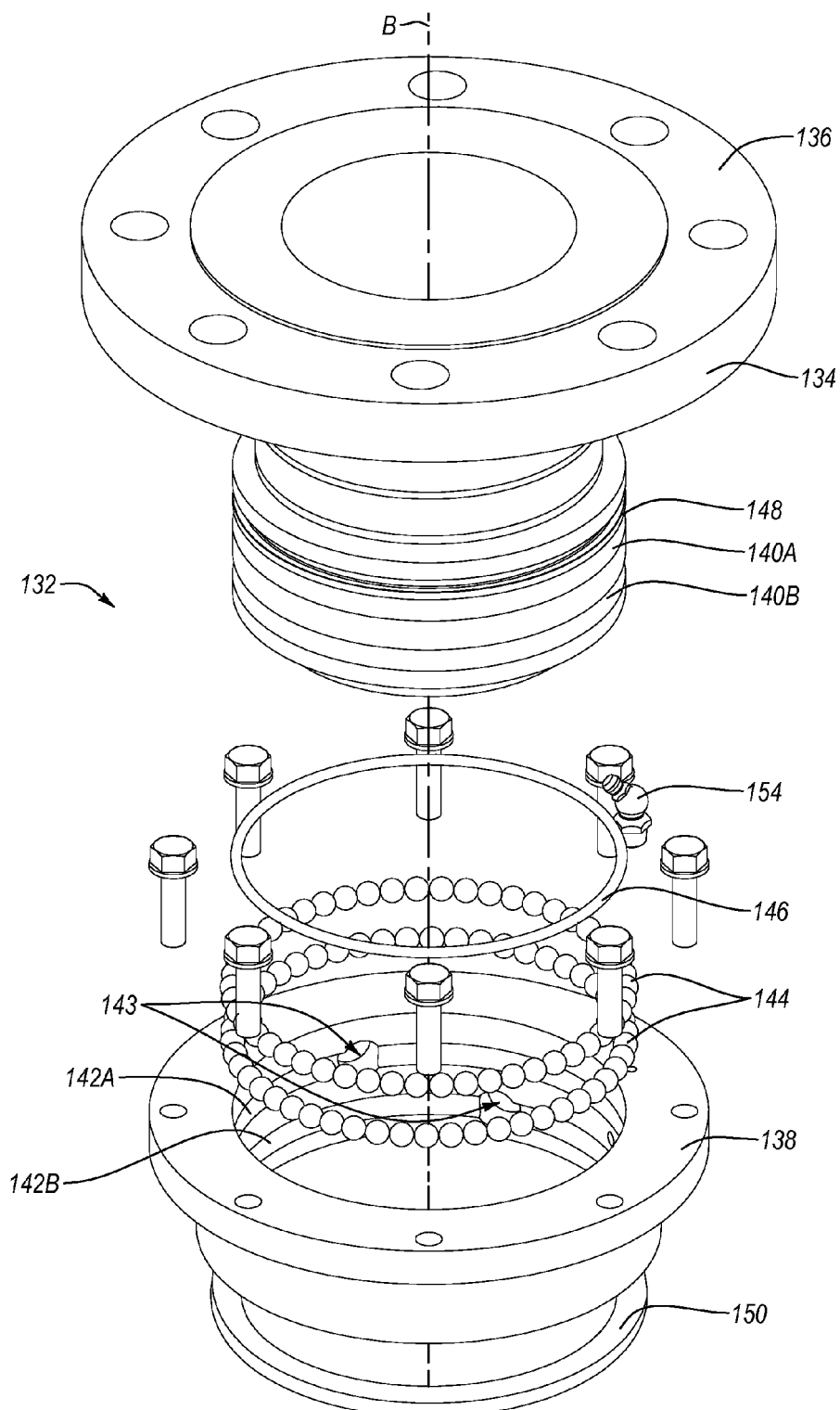
FIG. 5 illustrates an exploded view of a removable swivel module from the swivel joint of FIG. 3A.

While flange body 134 and collar 138 may be connected in fixed positions to stand pipe 108 and body 120, respectively, flange body 134 and collar 138 may be movably connected to one another. For instance, flange body 134 and collar 138 may be connected together in a manner similar to body 120 and tail 122. More specifically, as shown in FIGS. 4 and 5, flange body 134 includes flange body ball grooves 140A, 140B formed on an exterior surface and collar 138 includes collar ball grooves 142A, 142B formed on an interior surface. When flange body ball grooves 140A, 140B are aligned with collar ball grooves 142A, 142B, ball bearings 144 may be inserted therebetween. Ball bearings 144 may be inserted into the ball grooves through one or more ball holes 143 formed in collar 138. Once ball bearings 144 are inserted into the ball grooves, ball plugs 145 (not shown) may be used to close ball holes 143. The positioning of ball bearings 144 between flange body ball grooves 140A, 140B and collar ball grooves 142A, 142B both connects flange body 134 and collar 138 together and enables flange body 134 to rotate relative to collar 138.

Various seals may be used to prevent leaks between flange body 134, collar 138, and body 120. As shown in FIGS. 4 and 5, for instance, a seal 146, such as an O-ring, may be positioned between flange body 134 and collar 138 to prevent fluid from leaking between flange body 134 and collar 138. In the illustrated embodiment, flange body 134 includes a seal gland 148 that receives seal 146 at least partially therein. Seal gland 148 may take the form of an annular groove formed on the outer surface of flange body 134. With seal 146 received within seal gland 148, collar 138 may be positioned around flange body 134 and seal 146 may engage an interior surface of collar 138 to prevent fluid from flowing between flange body 134 and collar 138.

A seal 150 may also be positioned between flange body 134 and body 120 to prevent leaks therebetween. As shown in FIGS. 4 and 5, the second end of flange body 134 includes a seal gland 152 that receives seal 150 therein. When swivel module 132 is inserted into body 120, seal 150 engages an interior surface of body 120 to prevent fluid from flowing between body 120 and swivel module 132. Seal 150 may take a number of different forms. For instance, seal 150 may be an O-ring. Alternatively, seal 150 may be a ring that has a trapezoidal or other geometric cross-sectional shape.

Swivel module 132 may also include a grease fitting 154. Grease fitting 154 may include one or more channels that are in fluid communication with ball bearings 144, seal 146, and/or seal 150. Lubricants may be injected into grease fitting 154 to provide lubricant to ball bearings 144, seal 146, and/or seal 150.

With continued attention to FIGS. 3A-4, a counterbalancing mechanism will be discussed. The counterbalancing mechanism counterbalances the weight of loader arm 110 and any fluid therein. The counterbalancing mechanism may be disposed entirely or predominantly within swivel joint 118 and may be connected between or otherwise operatively associated with body 120 and tail 122. The primary components of the counterbalancing mechanism include a torsion spring 160, a worm gear tang plate 162, and a tail tang plate 164. As discussed in greater detail below, the counterbalancing mechanism can also include an adjustment mechanism.

As illustrated, tail tang plate 164 is generally disc shaped and may be secured within tail 122, as shown in FIG. 4. More specifically, tail tang plate 164 may be secured to an interior wall of tail 122, such as with bolts, screws, or other fasteners, to hold tail tang plate 164 is a fixed positioned within tail 122. Tail tang plate 164 includes two raised projections 166, 168 on a face there. When tail tang plate 164 is secured within tail 122, raised projections 166, 168 extend generally toward body 120. As best seen in FIG. 3B, raised projections 166, 168 cooperate to form a channel 170 therebetween. Channel 170 is configured to receive an inwardly projecting tang 172 from torsion spring 160. With tail tang plate 164 fixedly secured in tail 122, channel 170 is able to hold tang 172 in a generally fixed position Like tail tang plate 164, worm gear tang plate 162 is also generally disc shaped and includes two raised projections 174, 176 on a face thereof. When worm gear tang plate 162 is positioned within body 120, raised projections 174, 176 extend generally toward tail 122. While not shown, raised projections 174, 176 cooperate to form a channel 178 therebetween similar to channel 170 formed by raised projections 166, 168. Channel 178 is configured to receive a second inwardly projecting tang 180 from torsion spring 160. Unlike tail tang plate 164, however, worm gear tang plate 162 may be selectively rotated within body 120. Rotation of worm gear tang plate 162 within body 120 causes second tang 180 to rotate. Since tang 172 is held in place by channel 170, rotation of second tang 180 causes the tension in torsion spring 160 to increase or decrease, thereby adjusting the counterbalancing effect of counterbalance mechanism.

Worm gear tang plate 162 can be selectively rotated within body 120 via a worm gear arrangement. For instance, worm gear tang plate 162 may include gear teeth 182 disposed on an outer surface and which may be engaged by a worm gear 184. Worm gear 184 may be disposed in a recess 186 in body 120. As will be understood, rotation of worm gear 184 will cause worm gear tang plate 162 to rotate, thereby adjusting the tension in torsion spring 160.

Worm gear 184 may be selectively rotated with an adjustment mechanism 188. Adjustment mechanism 188 may include a tension shaft 190 that may be inserted into an opening 189 in body 120. In the illustrated embodiment, opening 189 opens on a first side of body 120 and extends a portion of the way through body 120. Such an arrangement may be used for a left-handed swivel joint (as shown in the Figures). In other embodiments, such as for a right-handed swivel joint, opening 189 may open on a second side of body 120 and extend a portion of the way through body 120. In still other embodiments, opening 189 may extend the entire way through body 120 from a first side to a second side. This arrangement may allow for body 120 to be used as part of either a left-handed or right-handed swivel joint. More specifically, when body 120 is used as part of a left-handed swivel joint, tension shaft 190 may be inserted into opening 189 on the first side of body 120. The portion of opening 190 that is open on the second side of body 120 may be plugged. Similarly, when body 120 is used as part of a right-handed swivel joint, tension shaft 190 may be inserted into opening 189 on the second side of body 120. The portion of opening 190 that is open on the second side of body 120 may be plugged.

Tension shaft 190 has a key 192 that engages a keyway in worm gear 184. The key and keyway cooperate to link the movement of tension shaft 190 and worm gear 184. Tension shaft 190 also includes an adjustment head 194 that is disposed on the outside of body 120 when swivel joint 118 is assembled, as shown in FIG. 3A. Thus, rotation of tension shaft 190 via head 194 causes worm gear 184 to rotate, which in turn causes worm gear tang plate 162 to rotate.

As can also be seen in FIG. 3B, adjustment mechanism 188 may also include a tension shaft seal 191, such as an O-ring, that may be disposed about tension shaft 190 to seal the space between tension shaft 190 and the opening in body 120 that receives tension shaft 190. In the illustrated embodiment, tension shaft 190 includes an annular groove 193 on an outer surface that is sized to receive tension shaft seal 191 therein.

Furthermore, body 120 may also include an opening 195 that is sized and configured to receive a tension shaft spring pin 197. Tension shaft spring pin 197 may selectively or permanently retain tension shaft 190 within body 120. More specifically, once tension shaft 190 is inserted into body 120, tension shaft spring pin 187 is inserted into opening 195. As can be seen in FIG. 3B, tension shaft 190 and tension shaft spring pin 197 form a generally right angle. In addition, tension shaft 190 includes an annular groove 199 on an outer surface that is configured to be engaged by tension shaft spring pin 197. When tension shaft spring pin 197 is inserted into opening 195 and engages groove 199 on tension shaft 190, removal of tension shaft 190 from body 120 is prevented. Nevertheless, the engagement between groove 199 and tension shaft spring pin 197 still allows for the rotation of tension shaft 190 in order to rotate worm gear 184, as discussed above.

Worm gear tang plate 162 and torsion spring 160 may be held within swivel joint 118 with a removable end plate 196. More specifically, body 120 may include an opening 198 formed therein to receive torsion spring 160 and worm gear tang plate 162. Once torsion spring 160 and worm gear tang plate 162 are positioned within swivel joint 118, opening 198 may be closed off by securing end plate 196 to body 120, such as with bolts, screws, or other fasteners. Alternatively, if swivel joint 118 needs to be disassembled, such as for servicing, end plate 196 may be removed from body 120 to allow for the removal of torsion spring 160 and/or worm gear tang plate 162. As with the other connections discussed herein, a seal 200 may be positioned between end plate 196 and body 120 to prevent leaks from forming therebetween.

Figure 6:
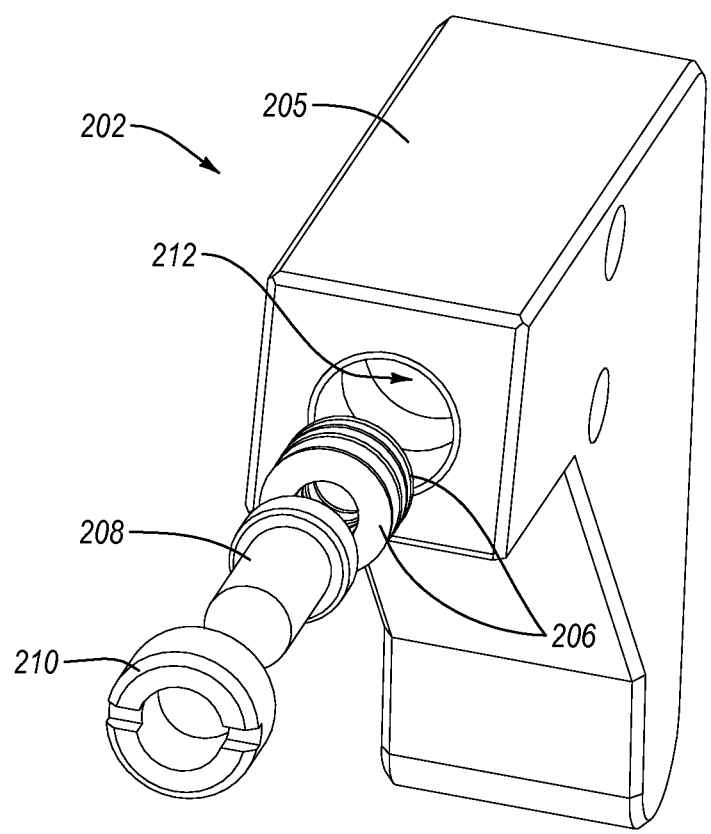
FIG. 6 illustrates an exploded view of a stop block assembly from the swivel joint of FIG. 3A.

As can be seen in FIGS. 3A-3B, tail 122 may include a stop block assembly 202 that can selectively engage one or more stop tangs 204 on body 120 to limit the range of motion of the tail 122 relative to the body 120. Stop block assembly 202 may include a stop block 205 that is connected to tail 122. Additionally, as shown in FIG. 6, stop block assembly 202 may include a force absorption mechanism. For instance, the force absorption mechanism may include one or more disc springs 206 and a snubber plunger 208. The one or more disc springs 206 may be positioned within a cavity 212 in stop block 205. Snubber plunger 208 may then be inserted into cavity 212 so that one end of snubber plunger 208 engages disc springs 206 and another end extends out of stop block 205. A retaining ring 210 may be used to secure snubber plunger 208 and disc springs 206 within cavity 212.

As tail 122 rotates about axis A, stop block assembly 202 may engage stop tangs 204 on body 120 to limit the range of motion of tail 122. The force absorption mechanism of stop block assembly 202 may absorb at least some of the forces when stop block assembly 202 engages stop tangs 204. By absorbing at least some of the forces, the force absorption mechanism can reduce the likelihood of damage to swivel joint 118. For instance, if tail 122 rotates rapidly around axis A, engagement between stop block assembly 202 and stop tang 204 may apply a force to stop tang 204 that is sufficient to break stop tang 204 off of body 120. However, the force absorption mechanism may absorb at least some of that force, thereby reducing the potential of breaking stop tangs 204.

Figure 7:
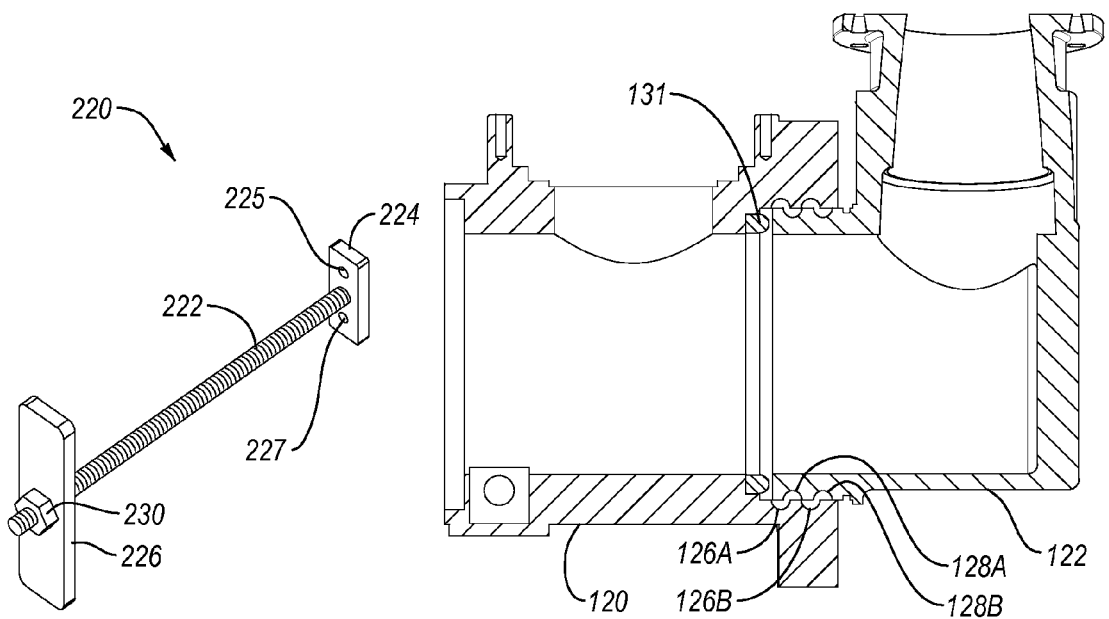
FIGS. 7-10 illustrate exemplary steps for rotatably connecting body and tail members of the swivel joint of FIG. 3A.

Attention is now directed to FIGS. 7-10, which illustrate exemplary steps for rotatably connecting body 120 and tail 122 together. As noted above, body 120 and tail 122 may be rotatably connected together via ball bearings 124 disposed within ball grooves 126A, 126B and 128A, 128B formed in body 120 and tail 122, respectively. As also noted, ball bearings 124 may only be inserted into the ball grooves when body ball grooves 126A, 126B are aligned with tail ball grooves 128A, 128B, respectively. As shown in FIG. 7, however, when tail 122 is initially inserted into body 120, tail ball grooves 128A, 128B do not align with body ball grooves 126A, 126B. The misalignment is a result of seal 131 being positioned between the surfaces of body 120 and tail 122. Accordingly, seal 131 must be compressed in order to align tail ball grooves 128A, 128B with body ball grooves 126A, 126B.

To compress seal 131, a compression tool 220 may be employed. As illustrated in FIG. 7, compression tool 220 may include an elongated shaft 222 with a weldment plate 224 disposed at a first end thereof. Weldment plate 224 may include one or more apertures, such as apertures 225, 227. A compression plate 226 is movably, and optionally removably, disposed on elongate shaft 222 adjacent a second end thereof. More specifically, compression plate 226 may include an aperture 228 (not shown) through which elongate shaft 222 may movably pass. Compression tool 220 also includes a jam nut 230 that may be positioned on the second end of elongate shaft 222. Jam nut 230 may prevent compression plate 226 from moving along elongate shaft 222 in a direction away from weldment plate 224. Additionally, jam nut 230 may also be rotated on elongate shaft 222 to move compression plate 226 along elongate shaft 222 in a direction toward weldment plate 224.

Figure 8:
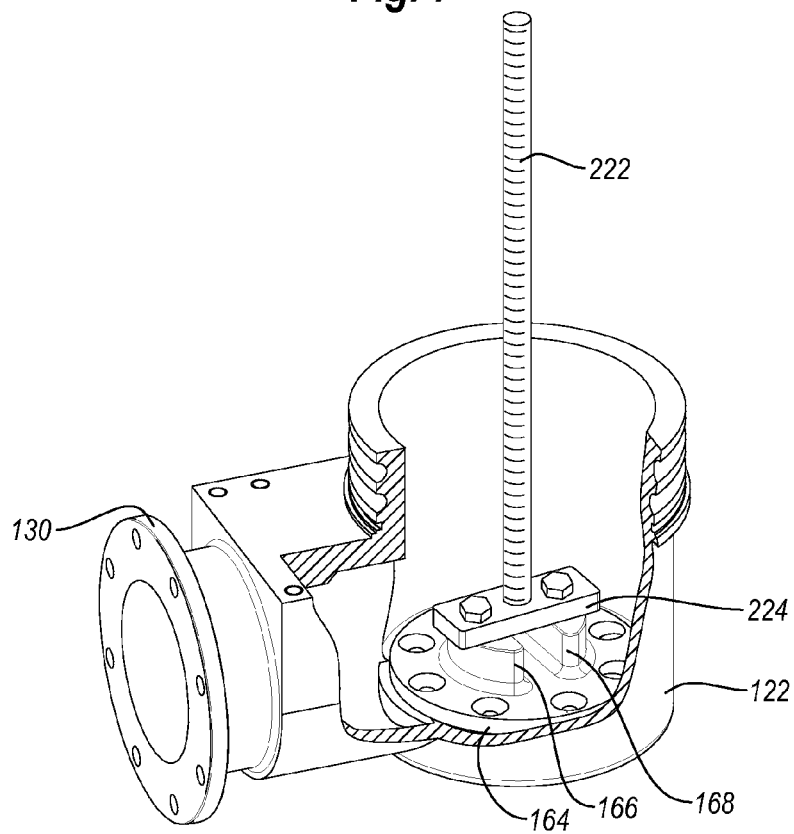
Figure 9:
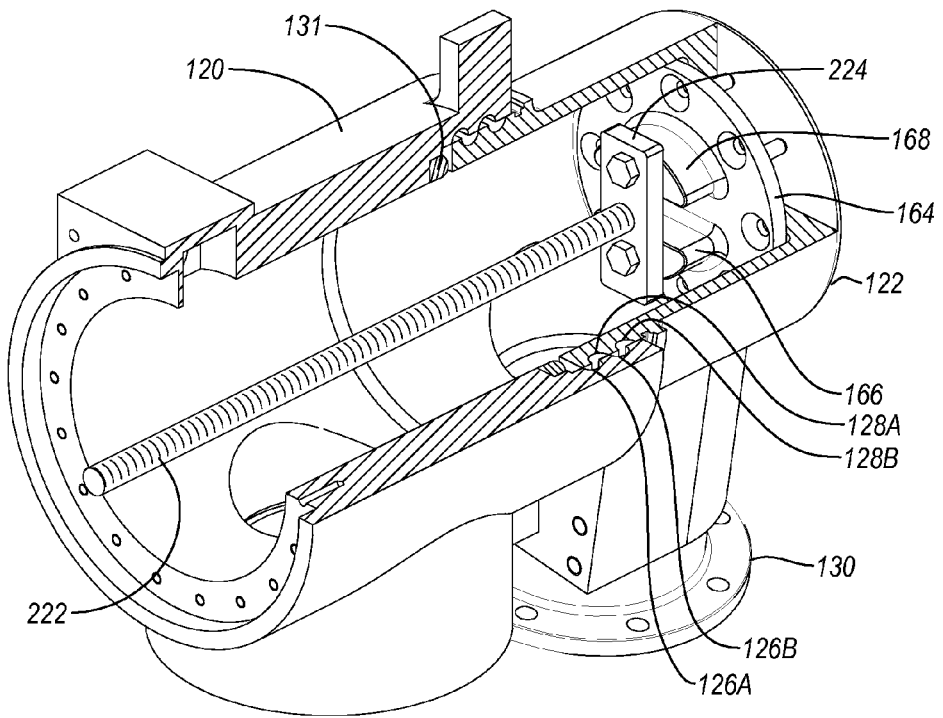
Figure 10:
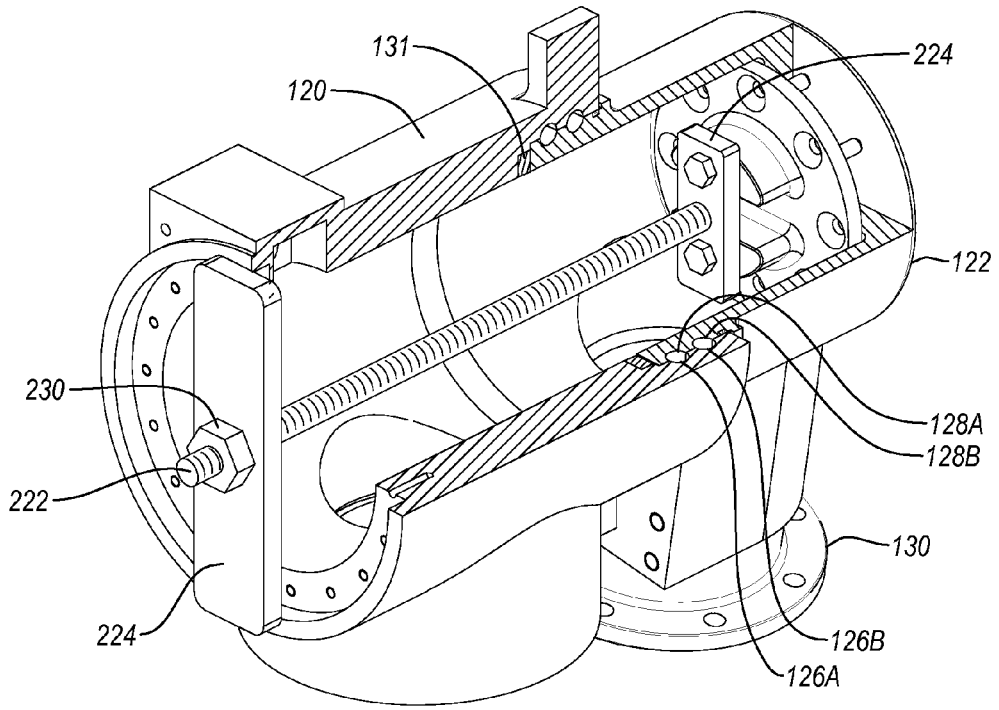

FIGS. 8-10 illustrate an example method of using compression tool 220 to compress seal 131 and align tail ball grooves 128A, 128B with body ball grooves 126A, 126B. As shown in FIG. 8, compression tool 220 may be connected to tail 122 prior to tail 120 being inserted into body 120. The connection between compression tool 220 and tail 122 is made by securing weldment plate 224 to tail tang plate 164. As illustrated, for example, bolts or other fasteners may be passed through apertures 225, 227 in weldment plate 224 and into threaded bores 232, 234 (see FIG. 3B).

Since compression tool 220 is connected to tail 122 prior to tail 120 being inserted into body 120, compression plate 226 has been removed from elongated shaft 222 so that body 120 may be positioned over elongated shaft 222 as shown in FIG. 9. Compression plate 226 may be removed from elongated shaft 222 by removing jam nut 230 from elongated shaft 222, which allows compression plate 222 to be removed. After body 120 is positioned over elongated shaft 222 such that tail 122 is inserted into body 120, compression plate 226 and jam nut 230 may be positioned on elongated shaft 222 as shown in FIG. 10.

It will be understood that body 120 and tail 122 may be assembled together prior to connecting compression tool 220 to tail 122. In such case, tail 122 may be inserted into body 120 as shown in FIG. 9. Thereafter, compression tool 220 may be inserted through opening 198 and weldment plate 224 may be secured to tail 122 as discussed above. When compression tool 220 is connected to tail 122 after tail 122 has been inserted into body, compression plate 226 may be left on elongated shaft 222.

In any case, once body 120, tail 122, and compression tool 220 are assembled as shown in FIG. 10, jam nut 230 may be tightened to move compression plate 226 toward weldment plate 224. As can be seen in FIG. 10, compression plate 226 engages body 120. Thus, as compression plate 226 moves toward weldment plate 224, compression plate 226 causes body 120 to move closer to tail 122, which compresses seal 131. As a result, tail ball grooves 128A, 128B and body ball grooves 126A, 126B are moved into alignment with one another.

With tail ball grooves 128A, 128B and body ball grooves 126A, 126B properly aligned, ball bearings 124 may be inserted into the ball grooves through ball holes 125 in body 120 (see FIGS. 3A-3B). Once ball bearings 124 are inserted into the ball grooves, ball holes 125 may be closed with ball plugs 127 and retaining rings 123. More specifically, ball plugs 127 can be inserted into ball holes 125 to close ball holes 125. Thereafter, retaining rings 123 can be positioned within ball holes 125 to retain ball plugs 127 therein. Retaining rings 123 can be fit partially within a channel or groove in ball holes 125 to retain ball plugs 127 within ball holes 125.

Once ball bearings 124 are inserted and ball holes 125 are closed, compression tool 220 may then be removed. Compression tool 220 may be removed by loosening jam nut 230 and removing compression plate 226 from elongate shaft 222 and then disconnecting weldment plate 224 from tail 122. Alternatively, compression tool 222 may be removed by disconnecting weldment plate 224 from tail 122 while leaving compression plate 226 on elongated shaft 222.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid swivel joint, comprising:
   a body defining first, second, and third openings;
   a tail rotatably connectable to the body at the first opening in the body, the tail comprising an integrally formed flange that is connectable to a first fluid conduit in a fluid system, wherein the body and tail cooperate to at least partially define a fluid passageway through said swivel joint;
   a counterbalancing mechanism disposed within the fluid passageway, the counterbalancing mechanism comprises a tail tang plate selectively connectable to an interior surface of the tail, the tail tang plate being held in a fixed position relative to the tail when the tail tang plate is connected to the tail, the counterbalancing mechanism having a selectively adjustable level of tension that adjusts the amount of force required to rotate the tail relative to the body, wherein at least a portion of the counterbalancing mechanism can be selectively inserted into or removed from the fluid passageway through the second opening in the body;

an end cap that selectively closes the second opening in the body; and a swivel module that rotatably connects the body to a second fluid conduit in a fluid system such that the body can rotate relative to the second fluid conduit, the swivel module comprising:

a collar that is selectively connectable to the body at the third opening in the body, wherein the collar is held in a fixed position relative to the body when the collar is connected to the body; and a flange body rotatably connectable to the collar such that the flange body can rotate relative to the collar and the body, the flange body having a flange that is connectable to the second fluid conduit.

2. A fluid swivel joint as recited in claim 1, wherein a first end of the counterbalancing mechanism is fixedly connected to the tail, a second end of the counterbalancing mechanism is rotatably disposed within the body such that the second end of the counterbalancing mechanism can be selectively rotated to adjust the level of tension of the counterbalancing mechanism.

3. A fluid swivel joint as recited in claim 1, wherein the tail tang plate comprises two raised projections that form a channel therebetween.

4. A fluid swivel joint as recited in claim 1, wherein the counterbalancing mechanism comprises a worm gear tang plate rotatably disposed within the body.

5. A fluid swivel joint as recited in claim 4, wherein the worm gear tang plate comprises two raised projections that form a channel therebetween.

6. A fluid swivel joint as recited in claim 4, wherein the counterbalancing mechanism comprises a torsion spring linked between the tail tang plate and the worm gear tang plate.

7. A fluid swivel joint as recited in claim 4, further comprising an adjustment mechanism that enables selective rotation of the worm gear tang plate to selectively adjust the level of tension of the counterbalancing mechanism.

8. A fluid swivel joint as recited in claim 7, wherein the adjustment mechanism comprises an adjustment head disposed on the outside of the body, wherein rotation of the adjustment head results in rotation of the worm gear tang plate and adjustment of the level of tension of the counterbalancing mechanism.

9. A fluid swivel joint as recited in claim 8, wherein the adjustment mechanism further comprises:

a worm gear disposed within the body and that engages the worm gear tang plate, the worm gear having a keyway; and a tension shaft, the adjustment head being disposed at a first end of the tension shaft, the tension shaft having a key that cooperates with the keyway of the worm gear, wherein rotation of the tension shaft via the adjustment head causes the worm gear to rotate, which results in rotation of the worm gear tang plate.

10. A fluid swivel joint as recited in claim 1, further comprising a seal disposed between the body and the tail, the seal having a trapezoidal cross-sectional shape.

11. A fluid swivel joint as recited in claim 1, wherein the body comprises one or more stop tangs.

12. A fluid swivel joint as recited in claim 11, further comprising a stop block assembly mounted on the tail, wherein the stop block assembly interacts with the one or more stop tangs on the body to limit the range of motion of the tail, wherein the stop block assembly comprises one or more force absorption members and a snubber plunger.

13. A fluid swivel joint, comprising:

a body defining first, second, and third openings;

a tail rotatably connectable to the body at the first opening in the body, the tail comprising an integrally formed flange that is connectable to a first fluid conduit in a fluid system, wherein the body and tail cooperate to at least partially define a fluid passageway through said swivel joint;

a counterbalancing mechanism disposed within the fluid passageway, wherein at least a portion of the counterbalancing mechanism can be selectively inserted into or removed from the fluid passageway through the second opening in the body, wherein the counterbalancing mechanism comprises:

a tail tang plate selectively connectable to an interior surface of the tail, the tail tang plate being held in a fixed position relative to the tail when the tail tang plate is connected to the tail;

a worm gear tang plate disposed within the body, the worm gear tang plate may be selectively rotated; and a torsion spring linked between the tail tang plate and the worm gear tang plate, wherein rotation of the worm gear tang plate adjusts a level of tension in the torsion spring;

an end cap that selectively closes the second opening in the body; and a selectively removable swivel module that rotatably connects the body to a second fluid conduit in a fluid system, the swivel module having a collar that is selectively and fixedly connectable to the body at the third opening in the body, and a flange body rotatably connectable to the collar and fixedly connectable to the second fluid conduit.

14. A fluid swivel joint as recited in claim 13, further comprising an adjustment mechanism that enables selective rotation of the worm gear tang plate to selectively adjust the level of tension in the torsion spring, the adjustment mechanism comprising:

a worm gear disposed within a recess in the body, wherein the worm gear engages the worm gear tang plate; and a tension shaft having a first end and a second end, the first end being linked to the worm gear and the second end having an adjustment head thereon, the adjustment head being disposed on the outside of the body, wherein rotation of the tension shaft via the adjustment head causes the worm gear to rotate, whereby the worm gear tang plate is rotated.

15. A fluid swivel joint as recited in claim 14, wherein the tension shaft and the worm gear are linked together via a key and keyway.

16. A fluid swivel joint as recited in claim 13, further comprising a stop block assembly mounted on the tail, the stop block assembly comprising:

a stop block having a cavity formed therein;

one or more force absorption members disposed within the cavity; and a snubber plunger positioned in the cavity and over the one or more force absorption members, wherein the snubber plunger extends out of the cavity to engage a stop tang on the body.

17. A fluid swivel joint, comprising:
- a body defining first, second, and third openings an having a stop tang;
- a tail rotatably connectable to the body at the first opening in the body, the tail comprising an integrally formed flange that is connectable to a first fluid conduit in a fluid system, wherein the body and tail cooperate to at least partially define a fluid passageway through said swivel joint;
- a counterbalancing mechanism disposed within the fluid passageway, the counterbalancing mechanism having a selectively adjustable level of tension that adjusts the amount of force required to rotate the tail relative to the body, wherein at least a portion of the counterbalancing mechanism can be selectively inserted into or removed from the fluid passageway through the second opening in the body;
- an end cap that selectively closes the second opening in the body; and
- a stop block assembly mounted on the tail, the stop block assembly comprising:
  - a stop block having a cavity formed therein;
  - one or more force absorption members disposed within the cavity; and
  - a snubber plunger positioned in the cavity and over the one or more force absorption members, wherein the snubber plunger extends out of the cavity to engage the stop tang on the body.

\* \* \* \* \*